United States Patent
Yoon et al.

(10) Patent No.: US 11,748,413 B1
(45) Date of Patent: Sep. 5, 2023

(54) PERSONALIZED QUERY SUGGESTION

(71) Applicant: Amazon Technologies, Inc., Seattle, WA (US)

(72) Inventors: Sungro Yoon, Redmond, WA (US); Pranav Varia, Bothell, WA (US); Soo-Min Pantel, Bellevue, WA (US); Daniel Lloyd, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 27 days.

(21) Appl. No.: 16/906,388

(22) Filed: Jun. 19, 2020

(51) Int. Cl.
*G06F 16/00* (2019.01)
*G06F 16/9032* (2019.01)
*G06F 16/2457* (2019.01)
*G06F 16/9535* (2019.01)
*G06F 16/9538* (2019.01)

(52) U.S. Cl.
CPC .. *G06F 16/90324* (2019.01); *G06F 16/24578* (2019.01); *G06F 16/90332* (2019.01); *G06F 16/9535* (2019.01); *G06F 16/9538* (2019.01)

(58) Field of Classification Search
CPC ........... G06F 16/90324; G06F 16/9535; G06F 16/24578; G06F 16/90332; G06F 16/9538
USPC ........................................ 707/730, 600–899
See application file for complete search history.

(56) References Cited

U.S. PATENT DOCUMENTS

| | | | | |
|---|---|---|---|---|
| 9,092,528 B1* | 7/2015 | Haahr | ................... | G06F 16/248 |
| 2011/0179021 A1* | 7/2011 | Wen | ........................ | G06F 16/58 |
| | | | | 707/723 |
| 2015/0095185 A1* | 4/2015 | Katukuri | ............. | G06F 16/9535 |
| | | | | 707/723 |
| 2016/0162502 A1* | 6/2016 | Zhou | ..................... | G06F 40/205 |
| | | | | 707/722 |
| 2018/0218082 A1* | 8/2018 | Mitra | .................... | G06F 16/958 |

* cited by examiner

*Primary Examiner* — Irete F Ehichioya
*Assistant Examiner* — Shirley D Hicks
(74) *Attorney, Agent, or Firm* — K&L Gates LLP

(57) ABSTRACT

Devices and techniques are generally described for generating personalized search query suggestions. In some examples, a first search query entered by a user into a search field may be determined. A first keyword associated with the first search query may be determined based at least in part on past interactions of the user with content. In various examples, first string data comprising at least a portion of the first search query and the first keyword may be generated. A data store may be searched using the first string data. A first suggested search string associated with the first string data may be determined. In some examples, the first suggested search string may be displayed on a display in association with the search field.

20 Claims, 7 Drawing Sheets

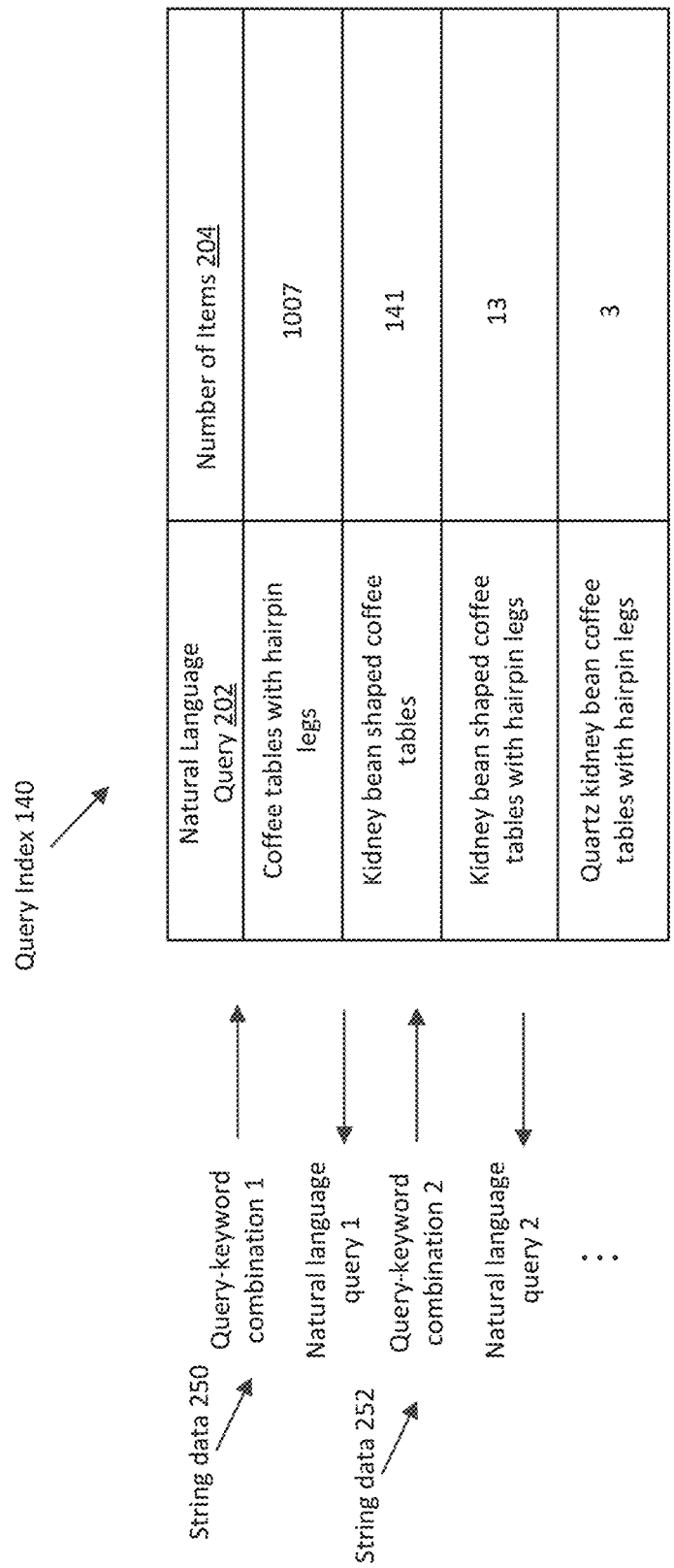

PERSONALIZED QUERY SUGGESTION

BACKGROUND

Electronic catalogs may be accessible via electronic pages, such as web pages or content pages displayed by a browser or mobile shopping application, with the electronic pages providing front-end user interfaces into the electronic catalogs. An example electronic page may enable users to provide verbal or textual user input identifying items of interest. The example electronic page may then update to display items responsive to the user input. Some electronic pages may additionally cause recommended items to be presented to a user. These recommended items may be based on user-ratings provided by other users. For example, the other users may indicate numerical ratings of items.

An example electronic catalog may allow third-party entities to provide item descriptions. In this way, users of the electronic catalog may view an item description prior to adding an item to his/her online shopping cart. In some cases, these descriptions may contain improper, misleading, or otherwise undesirable terms. As an example, a third-party entity may use improper terms to drive presentation of their items. For example, an item description of a baseball hat depicting a certain team logo may include a multitude of team names. As another example, a third-party entity may use poorly written natural language sentences, or the item descriptions may include typos or uncommon terms. Thus, a user experience associated with using the electronic catalog may be reduced because of the poor quality of search results.

BRIEF DESCRIPTION OF DRAWINGS

FIG. 2A depicts an example procedure for querying a query index using query-keyword combinations, in accordance with various aspects of the present disclosure.

DETAILED DESCRIPTION

Figure 1:
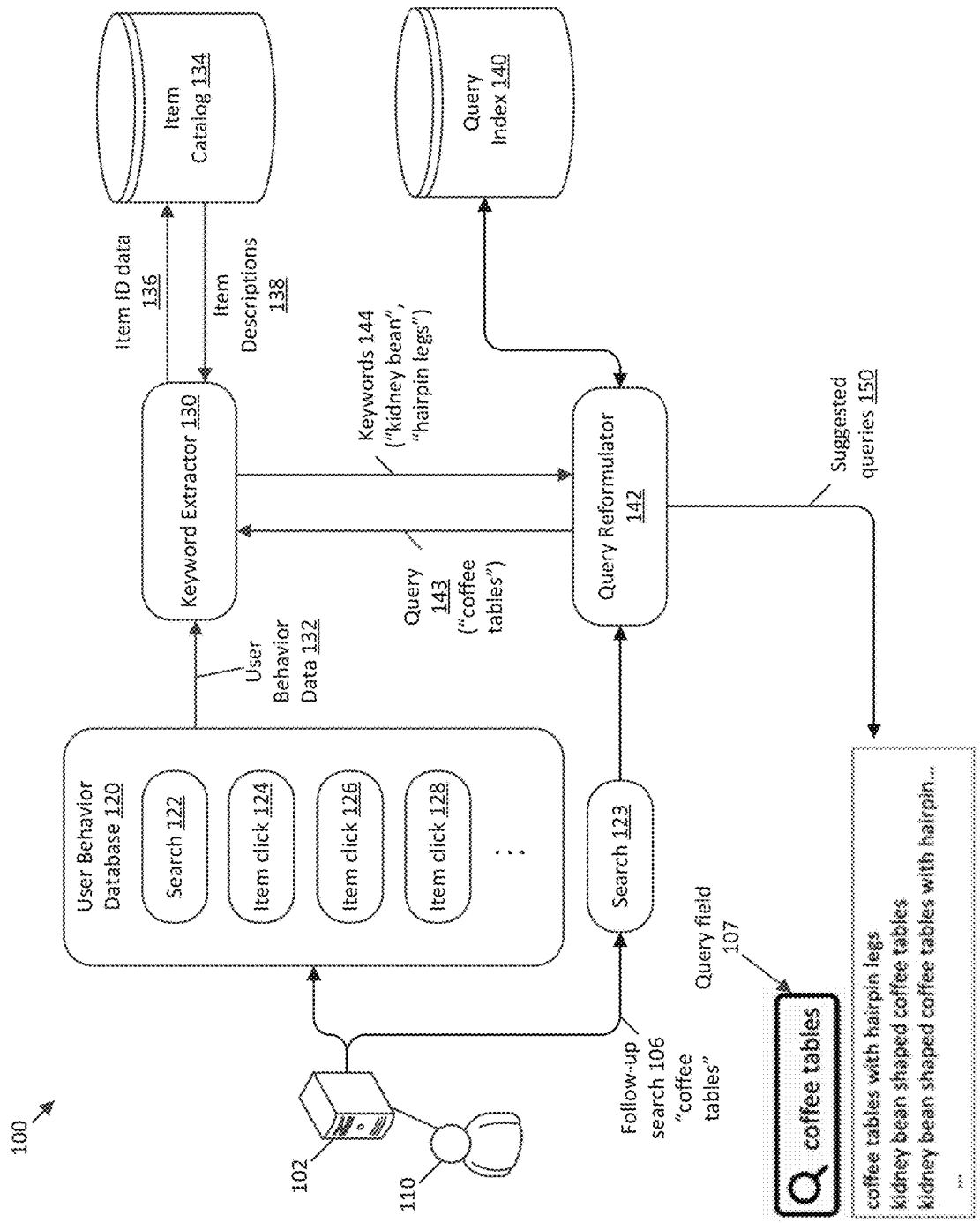
FIG. 1 is a block diagram depicting an example system effective to generate personalized search query suggestions, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

During online search, such as search of an online retail site, search terms (e.g., text and/or spoken utterances) are often used to find content of interest to a user. However, users may not know the appropriate terminology to use to search for the content the user is seeking. Additionally, search results for a given search query are typically static and identical for all users. For example, in an online item catalog used in e-commerce, product search typically shows popular items without regard to each user's interests expressed via past searches, clicks, and/or purchases. Accordingly, users having a specific interest may need to employ a lengthy search process in order to discover a particular item of interest, unless the user is aware of specific keywords associated with the specific item and distinguishing the specific item from among other, similar items.

In some examples, product search may not perform well in categories where users select items based on their specific attribute preferences. Empirical analysis has shown that users selecting items in "sensual" product categories (e.g., furniture, apparel, watches, etc.) spend more time and effort (in terms of the number of user clicks), compared to the number of clicks associated with user searches in popularity-driven categories such as consumables, digital video, gift cards, etc. This reveals a difficulty in current item search technologies, where current product search techniques are not optimized to return results that are highly-correlated with individual user preferences.

In an illustrative example that is used throughout the present disclosure, a user, Peter, may want to purchase a coffee table in a specific style. Specifically, Peter may wish to purchase a kidney bean shaped coffee table with hairpin legs. However, Peter may not be aware of the specific keywords (e.g., terminology) needed to surface such coffee tables. For example, while Peter may recognize the type of coffee table that he wants to buy when presented with a picture of such a coffee table, he may not know that such coffee tables are typically referred to as "kidney bean coffee tables" or that the style of coffee table legs that he prefers are known as "hairpin legs." Accordingly, in the example, Peter may type "coffee tables" in the search bar of an e-commerce service and may continue to scroll down until he sees an item of interest (or until he gives up on the search). In an example, Peter may scroll past many coffee tables that are not of interest, but may click on a few coffee tables of interest, without making a purchase decision.

In the example, the next day (or sometime after the initial search), Peter may return to the e-commerce site to search for coffee tables for purchase. However, Peter may still be unaware of the keywords that may best describe his preferred style of coffee table. Accordingly, Peter may need to repeat the process of the previous attempt, wherein he types "coffee tables" in the search field and scrolls until he sees a coffee table of interest. This may be a frustrating and time-consuming user experience for Peter.

Described herein are techniques that may be used to suggest personalized search queries based on past session specific, user-specific, and/or account specific behavior. For example, the techniques described herein may be used to identify user interest in specific item characteristics, based on past user behavior, and may provide automatically-generated query suggestions that the user may select for search. In the previous example, when Peter returns the following day to again search for coffee tables, when Peter types "coffee tables" in the search field, a drop-down list of personalized queries may be suggested based on Peter's previous search and his previous interaction with various search results. For example, the personalized queries "coffee tables with hairpin legs" and/or "kidney bean shaped coffee tables" may be suggested. The various techniques described herein may be particularly beneficial for mobile users as it may be more cumbersome to type lengthy search queries into mobile interface search fields.

One possible approach may be to re-rank search results based on a user's potential interests. For example, search results may be re-ranked based on target attributes identified on a user-specific basis. Using such an approach, coffee tables with Peter's preferred attributes may be up-ranked among search results provided after Peter types "coffee tables" into a search field.

However, the various techniques described herein offer flexibility over such a re-ranking approach. For example, the personalized query suggestions are provided as different options that the user may either select or disregard. By contrast, if the search results themselves are personalized (e.g., via re-ranking) the user does not have control over the personalization or re-ranking. As an example, assume that during his follow-up search Peter changed his mind and wanted to search for Scandinavian style coffee tables. Organizing the search results around "kidney bean shaped" and "hairpin legs" would be overly-aggressive and would result in a bad user experience for Peter if he wanted to surface Scandinavian style coffee tables during his follow-up search.

Additionally, the personalized query suggestion techniques described herein may be used to educate the user about the terminology associated with their potential interests. Often, users are unaware of the specific terminology that describes the characteristics which they are seeking. Using the techniques described herein, a user may be provided with personalized query suggestions that include keywords related to items with which the user previously interacted during a recent, similar search. Accordingly, the user can learn about relevant keywords from the personalized query suggestions provided using various techniques described herein.

FIG. 1 is a block diagram depicting an example system 100 effective to generate personalized query suggestions, according to various embodiments of the present disclosure.

As depicted in FIG. 1, a user 110 may interact with a search system (e.g., a search system for querying an e-commerce service, a web search service, etc.) using a computing device 102. Computing device 102 may be, for example, a desktop computing device, a laptop, a mobile device (e.g., a smartphone), a tablet, an embedded system, etc. In various examples, user 110 may provide search queries through a user interface (e.g., provided by a client application of an e-commerce service or web search service, a web browser, etc.) and may interact with search results through the user interface. The user interface may be displayed on a display (e.g., a search field used to search a web service for particular content). In another example, the user interface may not be displayed, but instead may be a voice controlled interface wherein the user makes verbal search queries and a voice assistant provides search results and/or other options with which the user may interact. In still further examples, some combination of visual and audio interfaces may be provided. Computing device 102 may communicate with one or more of the other components depicted in FIG. 1 over a network such as a local area network (LAN) and/or a wide area network (WAN) such as the internet.

User 110 may enter a first search query (e.g., by inputting text and/or speech into a visual and/or audio interface of computing device 102) at a first time. In an example, user 110 may initially search for "coffee tables," as described above. User 110's initial search for coffee tables may be stored in user behavior database 120 as search 122. In various examples, the search 122 may be stored in user behavior database 120 as string data representing the input search query and/or as category data describing a category of the user's search query (e.g., "furniture" or "furniture/coffee tables," etc.).

In response to the user's search 122, the e-commerce service and/or other search service may provide a plurality of search results. User 110 may scroll through (or otherwise navigate through) the search results and may interact with various results (e.g., by clicking on particular results and/or by using voice commands, gestures, and/or other input/output methodologies to view and/or learn more information about particular items). The user's interactions with the search results may be stored in user behavior database 120 in association with the search 122 (e.g., the query that returned the search results and/or the category of the query). In the example depicted in FIG. 1, the user interactions are stored as item click 124, item click 126, item click 128, etc. The item clicks 124, 126, 128 may indicate that the user clicked on (or otherwise selected) a particular search result that was provided in response to the search 122.

User behavior data 132 may comprise search 122 and the user interactions corresponding to search 122 (e.g., item clicks 124, 126, 128, etc.). User behavior data 132 may be sent to keyword extractor 130. Keyword extractor 130 may determine item identification data 136 identifying each of the search results interacted with by the user (e.g., via search session data that may include cookies stored on a browser and/or may include the user's account data indicating past searches/user interactions). For example, item click 124 may be associated with a first item ID, item click 126 may be associated with a second item ID, and so forth. The item ID data and/or the search 122 may be used to query item catalog 134 for item descriptions 138. Item descriptions 138 may include text descriptions and/or images associated with the item ID data 136. In addition, the item descriptions 138 may include metadata describing the items identified by item ID data 136. For example, keyword metadata describing the items may be included in the item descriptions 138. Keyword extractor 130 may determine one or more common attributes of the various items identified using the item ID data 136 from among the provided item descriptions 138. In various examples, the common attributes from among the item descriptions 138 may represent item attributes that are important to the user as these attributes may be common to several of the items with which the user has interacted during the search session. The common attributes may be represented by keyword extractor 130 as keywords, as described in further detail below.

The keyword extractor 130 may determine a category associated with a previous search query (e.g., search 122 from user behavior data 132). Keyword extractor 130 may determine common attributes of items with which the user has interacted in response to the previous search query (e.g., from the item descriptions 138). For example, the keyword extractor 130 may comprise one or more machine learning models that may learn that the user prefers a particular style of hat from among search queries corresponding to the category "hat." The keyword extractor 130 may learn the attributes that the user prefers for hats based on items with which the user has interacted in the past. For example, if a large percentage of hats that the user has interacted with have sports logos on them and/or are made of cotton, the keyword extractor 130 may determine the keywords 144 ("cotton" and "sports logos") for the search query category "hats."

In the foregoing example related to the search query "coffee tables," the keyword extractor 130 may determine based on user behavior data 132 (indicating previous search queries and previous user interactions with items) that the user prefers coffee tables with the attributes kidney bean shape and hairpin legs. Accordingly, keyword extractor 130 may learn the keywords 144 "kidney bean" and "hairpin legs" for the search query category "coffee tables."

Later, when the user 110 again uses the search query "coffee tables" via follow-up search 106, query reformulator 142 may determine that the query 143 ("coffee tables") from search 123 is related to a previous search 122 stored in user behavior database 120. In the current example, the follow-up search 106 and the initial search match as the input search query for both is "coffee tables." However, it may be appreciated that the text strings representing the search queries need not match exactly. In various examples, the follow-up search query may merely relate to the same item category as a recent search query in order to generate personalized query suggestions using the various techniques described herein. In at least some examples, the item categories may be delineated using metadata and/or based on browse nodes and/or database partitions/shards used to categorize the different items into item categories.

In some examples, the various searches and/or other user behavior data 132 (e.g., item clicks 124, 126, 128, purchase behavior, view behavior, etc.) stored in user behavior database 120 may be associated with decay parameters. The decay parameters may be used to weight past search queries/user interactions, such that only recent user-item interactions and/or user queries may be used to suggest personalized queries to the user. In this way, the user may search for different styles of items over time without the system rigidly learning that the user always prefers a particular style or attribute for an item category. Further, in some examples, the various searches and/or other user behavior data 132 (e.g., item clicks 124, 126, 128, purchase behavior, view behavior, etc.) stored in user behavior database 120 may be associated with importance parameters (or more generally scores) that represent an importance of the attribute to the particular user for a particular item category. In various examples, keywords 144 may be ranked using the importance parameters, as described in further detail below.

As previously described, later, when the user 110 again uses the search query "coffee tables" via follow-up search 106 entered into query field 107, query reformulator 142 may determine that the query 143 ("coffee tables") from search 123 is related to a previous search 122 stored in user behavior database 120. Upon determining that the search 123 is of the same category as a recent search 122 (or is otherwise related to a previous query), query reformulator 142 may send the query 143 (and/or a category of the query) to keyword extractor 130. Keyword extractor 130 may return the keywords 144 that have been previously learned based on recent user item interactions with items of the category, as described above.

In various examples, keyword extractor 130 may send a ranked list of keywords 144 to query reformulator 142. The ranked list of keywords 144 may be ranked using the importance parameter associated with the particular keyword for the item category. For example, if item click 124, item click 126, and item click 128 correspond to three different coffee tables that each had metadata and/or description data indicating that each of the three coffee tables are kidney bean shaped, the keyword 144 "kidney bean" may have a relatively high importance parameter for the user for the coffee table category based on recent user interactions stored in user behavior database 120. Accordingly, the keyword 144 "kidney bean" may be a top-ranked keyword among a ranked list of keywords sent from keyword extractor 130 to query reformulator 142. In another example, if some, but not all, coffee tables interacted with by the user 110 included the attribute (e.g., metadata and/or description data) "hairpin legs," the keyword "hairpin legs" may receive a lower importance parameter and/or ranking relative to "kidney bean" for the item category "coffee tables."

Query reformulator 142 may generate different combinations of string data using the keywords 144 received from keyword extractor 130 and/or the input search query (e.g., query 143 of search 123). In an example embodiment, query reformulator 142 may generate first string data by combining the input search query with the highest-ranked keyword 144 (e.g., "coffee tables" & "kidney bean"), second string data by combining the input search query with the second-ranked keyword 144 (e.g., "coffee tables" & "hairpin legs"), third string data by combining the input search query with the third ranked keyword 144 (e.g., "coffee tables" & "quartz"), and so on. In another embodiment, the query reformulator may generate string data comprising combinations of the input search query and multiple keywords (e.g., "coffee tables" & "kidney bean" & "hairpin legs").

Query reformulator 142 may use the string data generated by combining various combinations of the input search query and/or the keywords 144 to query query index 140. Query index 140 may be an index for data stored in a data store in one or more non-transitory computer-readable memories. As described in further detail below, query index 140 may comprise natural language queries and items that are returned as search results in response to use of the respective natural language queries (e.g., if user 110 enters a particular natural language query into the user interface of the e-commerce system and/or other search system the search system will return the items that are associated with that natural language query in the query index 140).

Query reformulator 142 may search the query index 140 to determine if a natural language query corresponds to the string data generated by query reformulator 142 from various combinations of keywords 144 and/or the input search query. If a natural language query stored in query index 140 corresponds to the input string data, query reformulator 142 may determine whether or not greater than a threshold number of search results (e.g., greater than a threshold number of items) is associated with the natural language query. If so, the natural language query may be sent by query reformulator 142 as one of the suggested queries 150 (e.g., for display in a drop down menu (or output as an audio suggestion and/or output in another manner) on an interface of computing device 102. In some examples, the number of suggested queries 150 may be limited to a small number of suggested queries (e.g., five or less) to avoid overwhelming the user. Suggested queries 150 may be search query suggestions for searching an e-commerce site and/or any search engine. Additionally, although past interactions with "items" are typically described herein as a basis for the suggested queries 150, the past interactions may instead be with content generally (e.g., media such as music, video, web sites, and/or other data), and may be used to generate search query suggestions for any type of content.

In various examples, each suggested query of the suggested queries 150 may be stored in a cache in association with the input query and/or input query category. Accordingly, when similar users and/or the same user 110 again inputs the same search query, the cache may be searched to determine if suggested queries 150 are cached in association with the currently-input query. Using a cache layer to quickly retrieve previous suggestions for common search queries may reduce latency and improve the user experience.

FIG. 2A depicts an example procedure for querying a query index 140 using string data comprising query-keyword combinations, in accordance with various aspects of the present disclosure.

As depicted in FIG. 2A, string data 250 may comprise a first query-keyword combination. The query may be represented by the query input by the user (e.g., "blue coffee tables") or by a category of the query (e.g., "coffee tables"). Any number of keywords may be combined with the query depending on the desired implementation. In an example, string data 250 representing query-keyword combination 1 may be "coffee tables" & "kidney bean." The query may be used to search the query index 140 to determine if any natural language queries 202 match the string data 250. In the example, the natural language queries "Kidney bean shaped coffee tables," "Kidney bean shaped coffee tables with hairpin legs," and "Quartz kidney bean coffee tables with hairpin legs" are associated with and may be returned in response to querying query index 140 with the input string data 250. Accordingly, for each of the associated natural language queries 202, query reformulator 142 may determine the number of items 204 that are associated with the associated natural language queries and compare the number of items to a threshold number of items.

In the current example, there may be a threshold number of 20 items (although the threshold number of items may be set to any desired number, according to the particular implementation). There are 141 items associated with the first natural language query "Kidney bean shaped coffee tables." Accordingly, "Kidney bean shaped coffee tables" may be suggested to the user as a personalized query suggestion based on the user's recent interaction with items of the category "coffee tables." Accordingly, as user 110 inputs "coffee tables" into the search field, the text "Kidney bean shaped coffee tables" may be suggested as a search query in a drop down box (and/or output as audio via a voice assistant). There are 13 items associated with the second natural language query "Kidney bean shaped coffee tables with hairpin legs." As this number of items falls below the example threshold, "Kidney bean shaped coffee tables with hairpin legs" may not be among suggested queries 150 (FIG. 1). Finally, "Quartz kidney bean coffee tables with hairpin legs" is only associated with 3 items which is also below the threshold value of 20 items. Accordingly, "Quartz kidney bean coffee tables with hairpin legs" is not among the suggested queries 150 suggested to the user.

For the next string data 252 comprising query-keyword combination 2 (e.g., "coffee tables" & "hairpin legs"), the string data 252 may be associated with the natural language queries "Coffee tables with hairpin legs," "Kidney bean shaped coffee tables with hairpin legs," and "Quartz kidney bean coffee tables with hairpin legs." Accordingly, for each of the associated natural language queries 202, query reformulator 142 may determine the number of items 204 that are associated with the associated natural language queries and compare the number of items to a threshold number of items.

In various examples, instead of determining if the number of items 204 are greater than a threshold number of items, the global frequency of the natural language queries 202 (e.g., the frequency with which the suggested queries are selected by other users when presented) may be used to determine whether to suggest a particular natural language query 202 as one of suggested queries 150. Additionally, the frequency with which a particular natural language query 202 is selected across different users and/or sessions may be used to determine an order in which the suggested queries 150 are output to the user, with more frequently-selected natural language queries being output prior to less-frequently selected queries. In addition, such frequency-based approaches for suggesting natural language queries may be combined with the thresholding techniques described above (or used instead of the thresholding techniques described above) when determining which natural language queries to suggest and in what order to suggest them.

Figure 2B:
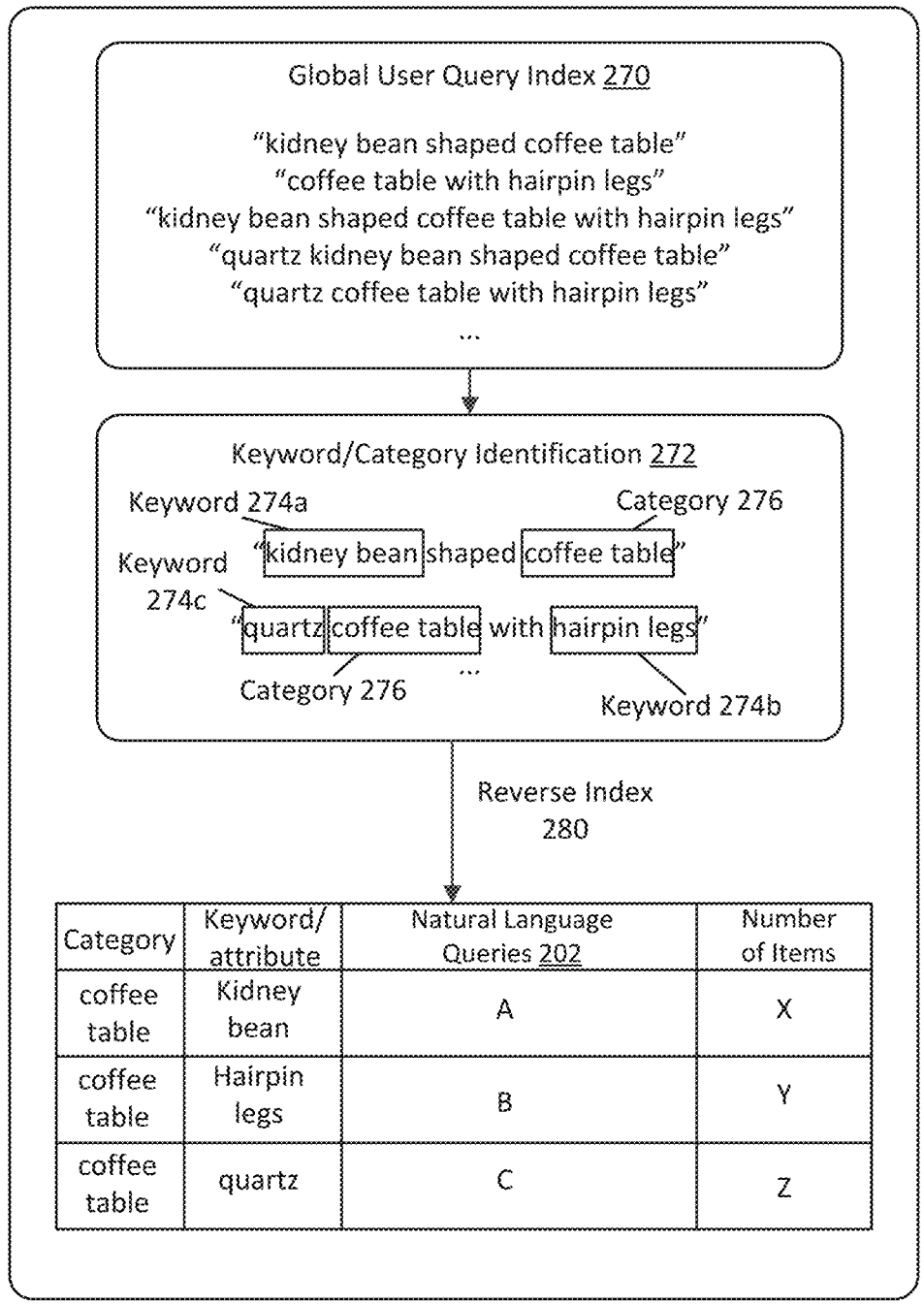
FIG. 2B depicts an example procedure for generating a query index, in accordance with various aspects of the present disclosure.

FIG. 2B depicts an example procedure for generating a query index, in accordance with various aspects of the present disclosure. A global user query index 270 may store user queries used to query a search system (e.g., an e-commerce site, web search engine, etc.) across different users of the search system. For each query in the global user query index 270, keyword extractor 132 (not shown in FIG. 2B) may be used to determine keywords (e.g., keywords 274a, 274b) and product categories 276 associated with the query at keyword/category identification 272. In various examples, keyword/category identification 272 may be performed periodically (e.g., weekly, monthly, etc.). After determining keywords/categories associated with each query of the global user query index 270, each query may be mapped to a product category and associated attribute(s) (e.g., as identified by keywords).

A reverse index 280 may be generated to map category and keyword/attribute(s) to natural language queries 202 and the number of items that are associated with those queries. This reverse index may be the query index 140 described herein and may be used as described above in reference to FIG. 2A to determine one or more personalized natural language queries 202 to suggest to a user based on past user behavior. For example, keywords and/or categories may be used to lookup natural language queries 202 in the reverse index 280. In thresholding-based examples, those natural language queries 202 associated with greater than the threshold number of items may be suggested to the user as a personalized search query (e.g., as one of the suggested queries 150 of FIG. 1).

Figure 3:
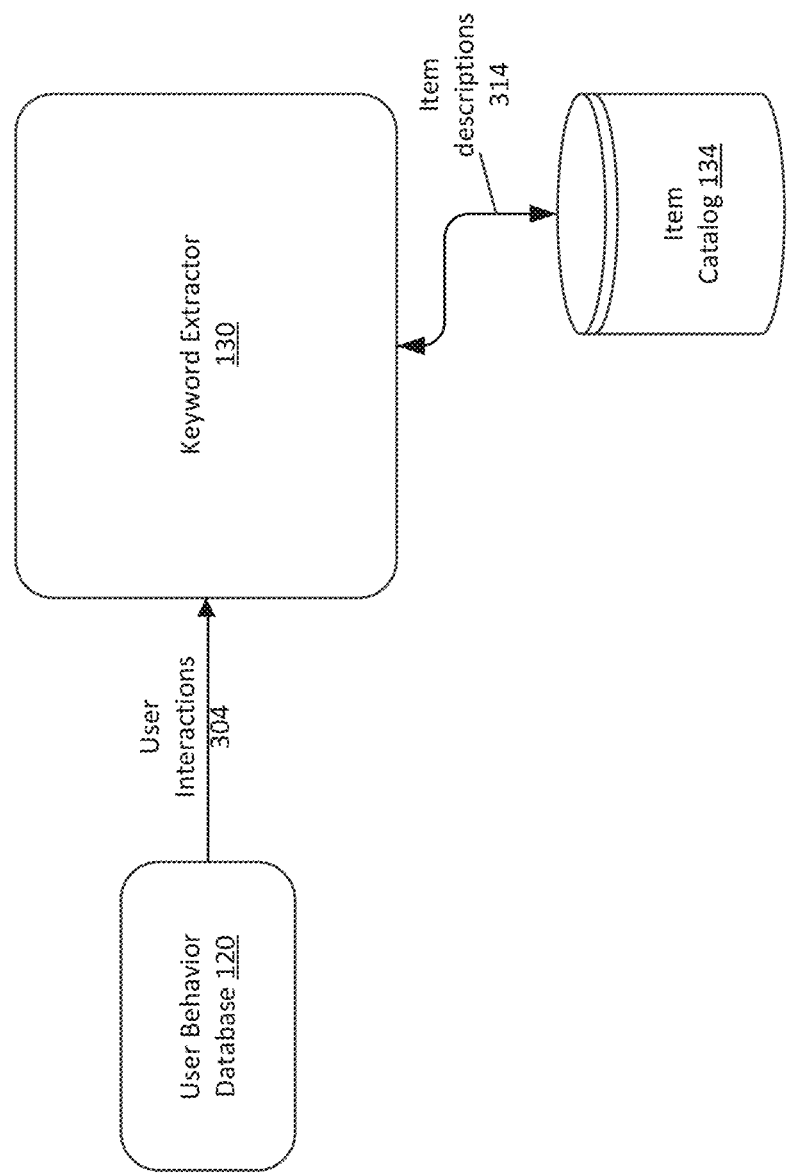
FIG. 3 depicts the keyword extractor component of FIG. 1 with additional details, in accordance with various aspects of the present disclosure.

FIG. 3 depicts the keyword extractor 130 of FIG. 1 with additional details, in accordance with various aspects of the present disclosure.

In various examples, the keyword extractor 130 may determine keywords representing item attributes based on a past user browsing session. As described above, the keyword may be associated with one or more of the items included in the user browsing session. A keyword 144 may be string data representing an item attribute. For example, the items may be included in an electronic catalog and information associated with the items may be accessible via an electronic store. The items may have been returned as a result of a previous search query input by the same user or otherwise associated with the same search session (e.g., an account of user 110). The keyword extractor 130 may determine the user interactions 304 stored in user behavior database 120. The keyword extractor 130 may retrieve the item descriptions 314 of those items with which the user has recently interacted in response to a previous query.

In various examples, the keyword extractor 130 may determine a decay parameter (e.g., a measure of time-decayed frequency). For example, the keyword extractor 130 may determine a measure of recency and frequency associated with an interaction with an item and/or with a previous user query or query category. In some embodiments, the system may compute:

$$TimeDecayedFreq(attr_i) = \sum_j Decay(|Now - EventTimeStamp(j)|) =$$

$$\sum_j \lambda \frac{|NOW - EventTimeStamp(j)|}{UnitTime}$$

In the above example, $attr_i$ may represent an identified attribute among items with which the user interacted. The keyword extractor 130 may determine a difference between a current time and times at which items associated with the object were interacted with. Optionally, instead of time the system may determine the difference based on an order in which items were viewed. For example, the user may have viewed 10 items in a current user browsing session. In this example, items associated with the attribute may have been viewed as the first item and the third item. Thus, the system may determine the difference based on the number of intervening items between a current item and the item associated with the attribute. It may be appreciated that as the user browses the electronic catalog, if the user ceases viewing items associated with an attribute then the system may identify a reduced interest in the attribute.

In some embodiments, A may be a value less than one. In some embodiments, A may represent a function learned by the system. For example, the keyword extractor 130 may analyze past historical information. Example historical information may include which items were recommended to users and which of the recommended items led to purchases by the users. The keyword extractor 130 may adjust A and then determine an effect of the adjustment with respect to an efficacy of the recommended items. In this way, the keyword extractor 130 may select A to cause a greatest purchasing of recommended items.

In some examples, the keyword extractor 130 may determine a measure of importance of the attribute (e.g., an importance parameter). In various examples, different attributes may be more, or less, important to the user 110. Accordingly, in some embodiments, the system may compute:

$$Importance(attr_i) = \log\left(\frac{N_{class}(attr_i)}{|Class(attr_i)|} - IDF(attr_i)\right)$$

In the above example, the importance of the attribute $attr_i$ may be determined. $|Class(attr_i)|$ may represent a cardinality associated with the attribute. For example, a number of variations of a class of the attribute may be identified. An example class of attribute may be professional football teams and the cardinality may be 32. To identify the cardinality, crowd-sourcing may be used. For example, the keyword extractor 130 may identify items viewed by other users which are in a same category of items. The keyword extractor 130 may then identify variations within the class of attribute. As an example, there may be thousands or more sizes of clothes. For example, sizing may vary according to type of clothes, country of origin, and so on. However, it may be appreciated that for t-shirts there may be a limited number of sizes (e.g., small, medium, large, and so on). Thus, while specific chest sizes (e.g., size 52, 44, and so on) may be used for clothes (e.g., suits), this sizing may not be applicable to t-shirts. The keyword extractor 130 may therefore identify the items viewed by other users which are t-shirts. The keyword extractor 130 may thus determine that for t-shirts the cardinality is a particular number (e.g., 4, 5, and so on).

In some embodiments, the keyword extractor 130 may use machine learning techniques. For example, a topic model may be trained to recognize variations within a class of attribute. As another example, a clustering technique may be employed. For example, a k-nearest neighbor (KNN) technique may be used to cluster attributes into respective classes of attributes. Thus, the system may cluster sizes of t-shirts, as identified based on user browsing sessions, into a same class of attribute. The keywords 144 returned by the keyword extractor 130 may represent the attributes determined by keyword extractor 130.

$N_{class}$ may represent a number of times the attribute class appears in a group of similar items (e.g., the group may be identified using k-nearest neighbors techniques). For example, an example attribute class may relate to a material. In this example, the system may identify a number of items which have a material attribute in a group of similar items. As another example, if there are two green items and two blue items in a group of ten items, then $N_{class}$(green) or $N_{class}$(blue) is equal to four. In this example, the keyword extractor 130 may identify the number of occurrences in which the color attributes appear in the group of ten items. In some embodiments, the group may be identified as a category of items being searched by the user. In some embodiments, the group may be identified based on items which other users viewed. For example, the keyword extractor 130 may monitor user browsing sessions of a multitude of users. In this example, the keyword extractor 130 may identify that users commonly (e.g., greater than a threshold measure) viewed certain items subsequent to viewing one or more of the items included in the user's browsing session. As an example, if the user is searching for hats, then the keyword extractor 130 may identify hats in the item descriptions 314 returned from item catalog 134 which other users viewed subsequent, or prior, to viewing one or more hats the user also viewed. The keyword extractor 130 may optionally constrain a size of the group. For example, the keyword extractor 130 may identify a threshold number of most frequently viewed items similar to the items in the user's browsing session (e.g., 10, 20, and so on).

$IDF(attr_i)$ may represent the inverse document frequency associated with the attribute. In some embodiments, this may represent a measure of how rare the attribute appears within the group described above. For example, the keyword extractor 130 may compute $IDF(attr_i)$ as $$\log\left(\frac{1}{N_{attr_i}}\right)$$

In the above example, $N_{attr_i}$ may represent a number of items included in the group which are associated with the attribute. In some examples, the keyword extractor 130 determines an attribute relevance score. The system may combine the measure of time-decayed frequency and measure of importance. For example the measures may be linearly combined as follows:

$$Score(attr_i) = Importance(attr_i)TimeDecayedFreq(attr_i)$$

In various examples, the keywords 144 returned by keyword extractor 130 to query reformulator 142 may be ranked using the attribute relevance scores. In some embodiments, the measures may be separately weighted, or the measures may be non-linearly combined. For example, the measure of importance may be weighted higher than the measure of time-decayed frequency. In some embodiments, the measures may be provided to a machine learning model which may generate an output value corresponding to the attribute relevance score.

Figure 4:
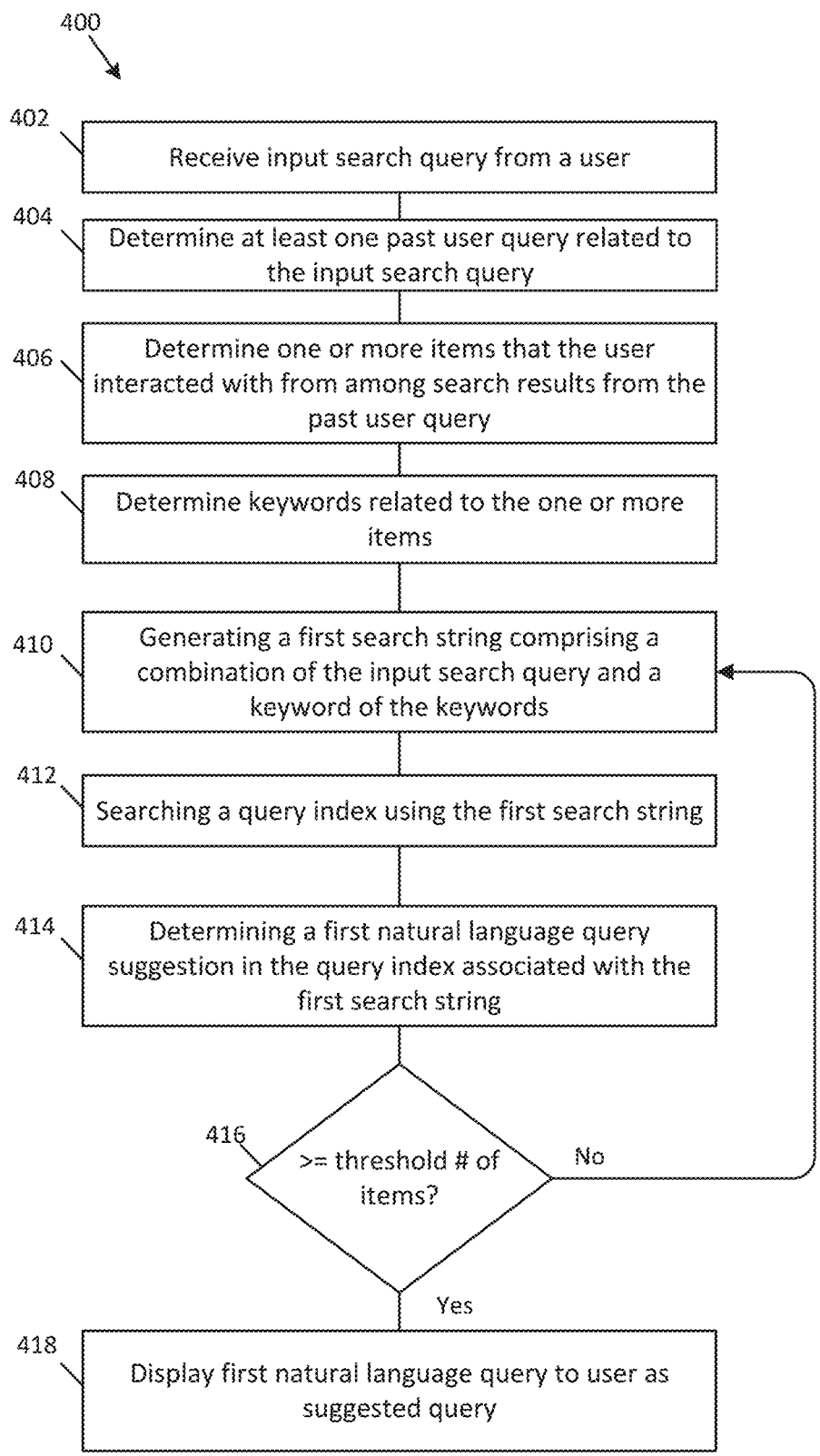
FIG. 4 depicts an example process for generating personalized query suggestions, in accordance with various aspects of the present disclosure.

FIG. 4 depicts an example process for generating personalized query suggestions, in accordance with embodiments of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 402, at which an input search query may be received from a user. At action 404, a determination may be made that there is at least one past user search query related to the input search query. For example, user behavior database 120 may be queried to determine whether or not there is a past search query (e.g., search 122) that matches, is of the same category, and/or is otherwise related to the current search query. In various examples, a relevance score of the past search query may be determined using the techniques described above in reference to FIG. 3. Accordingly, in at least some examples, a time decay parameter may cause the relevance score of a past search query that otherwise matches (e.g., is of the same category) the current search query to be diminished over time.

Processing may continue from action 404 to action 406, at which one or more items that the user has interacted with from among the search results for the past user query may be determined. For example, user behavior database 120 may determine a list of items that the user interacted with during the past search that is related to the current search (e.g., due to the search queries matching and/or being related to the same category of item).

Processing may proceed to action 408, at which keywords related to the one or more items may be determined. As described above in reference to FIG. 3, the keyword extractor 130 may learn the attributes of the items that are most important to the user based on the item descriptions of the items with which the user has interacted. Additionally, as described above, the keyword extractor 130 may determine keywords related to the attributes and may rank the keywords based on the relevance scores determined for the attributes.

Processing may continue from action 408 to action 410, at which a first search string may be generated using a combination of the input search query (e.g., the current search query) and a keyword of the list of keywords. For example, the current search query may be combined with the top keyword in the ranked list of keywords, the top two keywords in the ranked list of keywords, etc., according to the desired implementation.

Processing may continue from action 410 to action 412, at which a query index may be queried using the first search string. At action 414, if there is a natural language query that is returned in response to searching the query index (e.g., query index 140) with the string data generated at action 410, processing may continue to action 416, at which a determination may be made whether the number of items associated with the natural language query in the query index 140 exceeds a predetermined threshold. If not, processing may return to action 410 and another search string may be generated using another combination of one or more keywords and/or the current search query. If so, processing may continue to action 418, at which the first natural language query may be displayed (and/or otherwise output) to the user as a suggested query.

Figure 5:
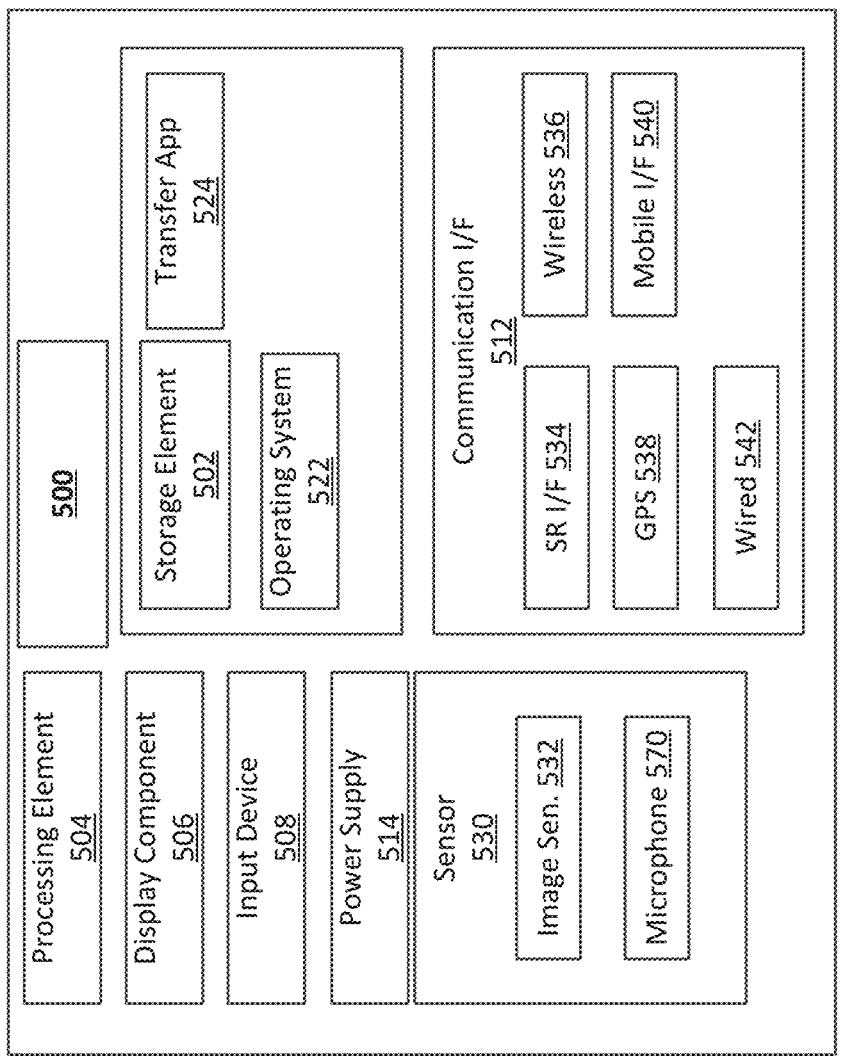
FIG. 5 is a block diagram showing an example architecture of a computing device that may be used in accordance with various embodiments described herein.

FIG. 5 is a block diagram showing an example architecture 500 of a computing device that may be used to generate the graphical user interfaces and/or the machine learning models described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
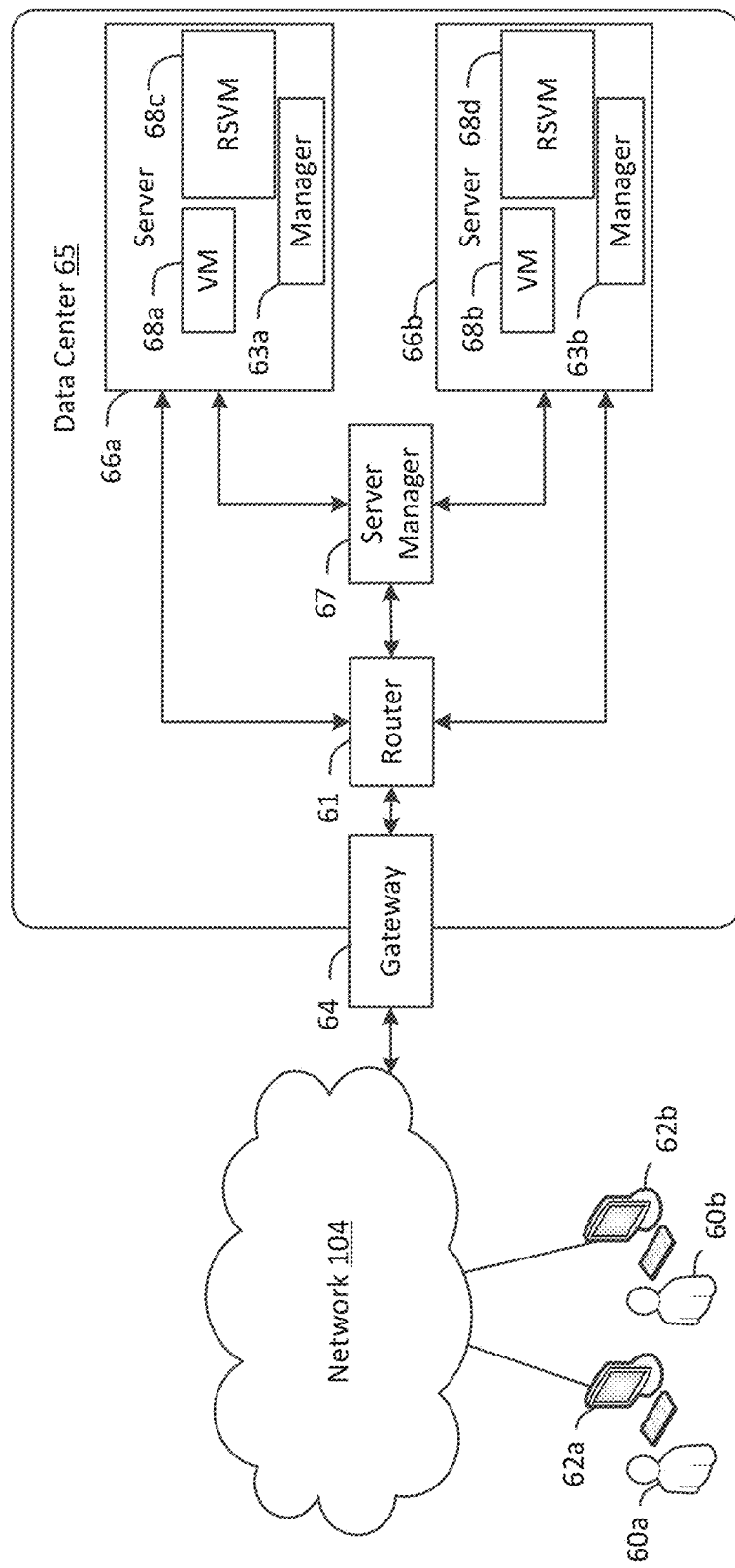
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM")

instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of personalized search query recommendation comprising:
   receiving an input search query from a user;
   determining at least one past user query related to the input search query;
   determining one or more items that the user interacted with from among search results from the at least one past user query;
   determining a plurality of keywords related to the one or more items;
   generating a first search string comprising a combination of the input search query and a first keyword of the plurality of keywords, wherein the first keyword describes a first item with which the user interacted;
   searching a query index using the first search string;
   determining a first natural language query suggestion in the query index associated with the first search string;
   determining that greater than a threshold number of items are associated with the first natural language query suggestion in the query index; and
   generating code effective to cause the first natural language query suggestion to be displayed on a display of the user, wherein the first natural language query suggestion is displayed as a suggested search string for querying an online item catalog.

2. The method of claim 1, further comprising:
   determining a ranked list of the plurality of keywords ranked using respective relevance scores for each keyword;
   generating a second search string comprising a combination of the input search query and a top-ranked keyword of the ranked list of the plurality of keywords;
   determining that less than the threshold number of items is associated with the second search string;
   generating a third search string comprising a combination of the input search query and a second keyword of the ranked list of the plurality of keywords;
   determining that greater than the threshold number of items are associated with the third search string; and
   generating code effective to cause a second natural language query suggestion associated with the third search string to be displayed on the display of the user, wherein the second natural language query suggestion is displayed as a second suggested search string for querying the online item catalog.

3. The method of claim 1, further comprising:
   determining that the input search query is related to a first category of items;
   determining that the at least one past user query is related to the first category of items; and
   determining the plurality of keywords in response to both the input search query and the at least one past user query being related to the first category of items.

4. A method, comprising:
   determining a first search query entered into a search field, the first search query being associated with first session data;
   determining, by at least one processor, a first keyword associated with the first search query based at least in part on past interactions with items, the past interactions being associated with the first session data, wherein the first keyword is included in a description of a first item that was interacted with during the past interactions;
   generating, by the at least one processor, first string data comprising at least a portion of the first search query and the first keyword;
   searching a data store using the first string data comprising at least the portion of the first search query and the first keyword;
   determining a first suggested search string stored in the data store in association with the first string data comprising at least the portion of the first search query and the first keyword; and
   causing, by the at least one processor, the first suggested search string to be output as a search query suggestion.

5. The method of claim 4, further comprising:
   determining a second keyword associated with the first search query based at least in part on the past interactions;

generating second string data comprising the first search query and the second keyword;
searching the data store using the second string data;
determining a second suggested search string associated with the second string data; and
determining that less than a threshold number of search results are associated with the second suggested search string, wherein the first suggested search string is output based at least in part on the second suggested search string being associated with less than the threshold number of search results.

6. The method of claim 4, further comprising determining that an entry in the data store located using the first string data indicates that the first suggested search string is associated with greater than a threshold number of search results, wherein the causing the first suggested search string to be output as the search query suggestion is based at least in part on the first suggested search string being associated with greater than the threshold number of search results.

7. The method of claim 4, further comprising:
determining a second keyword associated with the first search query based at least in part on the past interactions; and
generating the first string data comprising the first search query, the first keyword, and the second keyword.

8. The method of claim 4, further comprising:
determining that the first search query is related to a first category of items;
determining the past interactions with items of the first category of items; and
determining the first keyword from among keywords associated with one or more of the items of the first category of items.

9. The method of claim 4, further comprising:
determining a ranked list of keywords associated with the first search query based at least in part on the past interactions, wherein the first keyword is a top-ranked keyword of the ranked list of keywords;
generating second string data comprising at least the portion of the first search query and a second keyword that is a second-ranked keyword of the ranked list of keywords;
searching the data store using the second string data;
determining a second suggested search string associated with the second string data; and
causing the second suggested search string to be output as a second search query suggestion in association with the search field.

10. The method of claim 4, further comprising:
determining a ranked list of keywords associated with the first search query based at least in part on the past interactions, wherein the first keyword is a top-ranked keyword of the ranked list of keywords;
generating second string data comprising a combination of the top-ranked keyword and a second-ranked keyword of the ranked list of keywords;
searching the data store using the second string data;
determining a second suggested search string associated with the second string data; and
causing the second suggested search string to be output as a second search query suggestion in association with the search field.

11. The method of claim 4, further comprising:
storing the first suggested search string in a cache in association with the first search query;
receiving a second search query entered into the search field, wherein the second search query is related to the first search query; and
retrieving the first suggested search string from the cache using the second search query to search the cache.

12. The method of claim 4, further comprising:
determining the first keyword based at least in part on the past interactions, wherein a decay parameter is used to weight past interactions with items based on a recency of the past interactions.

13. A system comprising:
at least one processor; and
at least one non-transitory computer-readable memory storing instructions that, when executed by the at least one processor, are effective to program the at least one processor to:
determine a first search query entered into a search field, the first search query being associated with first session data;
determine a first keyword associated with the first search query based at least in part on past interactions with items, the past interactions being associated with the first session data, wherein the first keyword is included in a description of a first item that was interacted with during the past interactions;
generate first string data comprising at least a portion of the first search query and the first keyword;
search a data store using the first string data comprising at least the portion of the first search query and the first keyword;
determine a first suggested search string stored in the data store in association with the first string data comprising at least the portion of the first search query and the first keyword; and
cause the first suggested search string to be output as a search query suggestion in association with the search field.

14. The system of claim 13, the at least one non-transitory computer-readable memory storing further instructions that, when executed by the at least one processor, are further effective to program the at least one processor to:
determine a second keyword associated with the first search query based at least in part on the past interactions;
generate second string data comprising the first search query and the second keyword;
search the data store using the second string data;
determine a second suggested search string associated with the second string data; and
determine that less than a threshold number of search results are associated with the second suggested search string, wherein the first suggested search string is output instead of the second suggested search string based at least in part on the second suggested search string being associated with less than the threshold number of search results.

15. The system of claim 13, the at least one non-transitory computer-readable memory storing further instructions that, when executed by the at least one processor, are further effective to program the at least one processor to:
determine that an entry in the data store located using the first string data indicates that the first suggested search string is associated with greater than a threshold number of search results, wherein the causing the first suggested search string to be output as the search query suggestion is based at least in part on the first suggested search string being associated with greater than the threshold number of search results.

16. The system of claim 13, the at least one non-transitory computer-readable memory storing further instructions that, when executed by the at least one processor, are further effective to program the at least one processor to:
determine a second keyword associated with the first search query based at least in part on the past interactions; and
generate the first string data comprising the first search query, the first keyword, and the second keyword.

17. The system of claim 13, the at least one non-transitory computer-readable memory storing further instructions that, when executed by the at least one processor, are further effective to program the at least one processor to:
determine that the first search query is related to a first category of items;
determine the past interactions with items of the first category of items; and
determine the first keyword from among keywords associated with one or more of the items of the first category of items.

18. The system of claim 13, the at least one non-transitory computer-readable memory storing further instructions that, when executed by the at least one processor, are further effective to program the at least one processor to:
determine a ranked list of keywords associated with the first search query based at least in part on the past interactions, wherein the first keyword is a top-ranked keyword of the ranked list of keywords;
generate second string data comprising at least the portion of the first search query and a second keyword that is a second-ranked keyword of the ranked list of keywords;
search the data store using the second string data;
determine a second suggested search string associated with the second string data; and
cause the second suggested search string to be output as a second search query suggestion in association with the search field.

19. The system of claim 13, the at least one non-transitory computer-readable memory storing further instructions that, when executed by the at least one processor, are further effective to program the at least one processor to:
determine a ranked list of keywords associated with the first search query based at least in part on the past interactions, wherein the first keyword is a top-ranked keyword of the ranked list of keywords;
generate second string data comprising a combination of the top-ranked keyword and a second-ranked keyword of the ranked list of keywords;
search the data store using the second string data;
determine a second suggested search string associated with the second string data; and
cause the second suggested search string to be output as a second search query suggestion in association with the search field.

20. The system of claim 13, the at least one non-transitory computer-readable memory storing further instructions that, when executed by the at least one processor, are further effective to program the at least one processor to:
store the first suggested search string in a cache in association with the first search query;
receive a second search query entered into the search field, wherein the second search query is related to the first search query; and
retrieve the first suggested search string from the cache using the second search query to search the cache.

* * * * *